United States Patent [19]

Samuelson

[11] Patent Number: 4,725,335

[45] Date of Patent: Feb. 16, 1988

[54] PROCESS FOR PRODUCING NITROGEN OXIDES FROM AQUEOUS WASTE CELLULOSE PULP LIQUOR CONTAINING NITROGEN COMPOUNDS

[75] Inventor: Hans O. Samuelson, Gothenburg, Sweden

[73] Assignee: Mo och Domsjo Aktiebolag, Ornskoldsvik, Sweden

[21] Appl. No.: 716,418

[22] Filed: Mar. 28, 1985

[30] Foreign Application Priority Data

Mar. 28, 1984 [SE] Sweden .................................. 8401716

[51] Int. Cl.[4] .......................... D21C 3/14; D21C 11/00
[52] U.S. Cl. ......................................... 162/29; 162/38; 162/81; 423/405; 423/DIG. 3
[58] Field of Search ...................... 162/29, 32, 37, 38, 162/39, 40, 81, 65; 423/393, 525, DIG. 3, 400, 405

[56] References Cited

U.S. PATENT DOCUMENTS

| | | | |
|---|---|---|---|
| 3,578,553 | 5/1971 | Godsay et al. | 162/81 |
| 4,076,579 | 2/1970 | Brink | 162/81 |
| 4,406,735 | 9/1983 | Samuelson | 162/81 |

FOREIGN PATENT DOCUMENTS 2483972  12/1981  France .................................. 162/81

OTHER PUBLICATIONS

Hawley, "The Condensed Chemical Dictionary", Van Nostrand Reinhold Company, N.Y., 1981, p. 793.

*Primary Examiner*—Steve Alvo

[57] ABSTRACT

A process is provided for producing nitrogen oxides from aqueous waste cellulose pulp liquors containing nitrogen compounds including oxygen linked to nitrogen in the molecule, which includes initiating an autocatalytic reaction generating nitrogen oxide in a liquid phase comprising aqueous waste cellulose pulp liquor containing nitrogen compounds including oxygen linked to nitrogen in the molecule at a temperature within the range from about 40° to about 180° C. and at an acid pH within the range from about 0 to about 5 in the presence of nitrate ion $NO_3^-$ in a concentration calculated as nitrogen within the range from about 0.2 to about 5 grams moles per kilogram of water and of lignin in a weight ratio lignin:water within the range from about 0.001:1 to about 1:1; and then continuing the autocatalytic reaction while maintaining a gas phase in contact with the liquid phase having a partial pressure of nitrogen oxide within the range from about 0.005 MPa to about 2 MPa, and withdrawing nitrogen oxide from the gas phase so as to maintain said partial pressure.

13 Claims, No Drawings

PROCESS FOR PRODUCING NITROGEN OXIDES FROM AQUEOUS WASTE CELLULOSE PULP LIQUOR CONTAINING NITROGEN COMPOUNDS

The pretreatment of cellulose pulp with nitrogen dioxide and oxygen gas permits a more extensive alkaline delignification when the treated pulp is subjected to an alkaline oxygen gas bleaching than is possible when cellulose pulp that has not been pretreated is subjected to alkaline oxygen gas bleaching under the same conditions. For example, at a nitrogen dioxide charge of 4%, based on the dry weight of the pulp, such a pretreatment makes it possible to lower the lignin content (measured as Kappa number) of an oxygen bleached sulphate pulp produced from pine or spruce from 32 to 8, without reducing the viscosity of the pulp below 950 dm$^3$ per kilogram, the lower limit normally found acceptable for oxygen-bleached pulp. When the pretreatment is omitted, however, this pulp viscosity is reached at a Kappa number of 16.

The same delignifying effect can be obtained by addition of nitric acid together with nitrogen dioxide in the pretreatment. This makes it possible to reduce the nitrogen dioxide charge to 2% while giving the same delignifying effect. Addition of a nitrate, such as sodium nitrate, to the pulp during the pretreatment also contributes to low nitrogen dioxide consumption.

Nonetheless, considerable amounts of nitrogen oxides are required for such a pretreatment. Nitrogen oxides are normally prepared by burning ammonia with oxygen gas or in air. The required amount of nitrogen oxide can either be purchased or produced on site in the pulping plant. Regardless of the source, however, the cost of the nitrogen oxide is considerable, and greatly increases the cost of manufacturing the pulp. In addition, stringent safety precautions must be observed when transporting and handling nitrogen oxides. It would therefore be far better if the nitrogen oxides could be produced inexpensively at the pulping plant.

The waste cellulose pulp liquors from nitrogen oxide treatment of cellulose pulp contain nitrogen oxides either as a nitrate salt, for example sodium nitrate, or as nitric acid, or a mixture of both. In addition, there are lignin compounds containing nitrogen oxide groups. Recovery of the nitrogen oxides from these sources present in such waste liquors would provide an inexpensive source of nitrogen oxides in the pulping plant, but no process is available for recovery of these nitrogen compounds.

In accordance with the present invention, a process is provided for producing nitrogen oxides from aqueous waste cellulose pulp liquors containing nitrogen compounds including oxygen linked to nitrogen in the molecule, which comprises initiating an autocatalytic reaction generating nitrogen oxide in a liquid phase comprising aqueous waste cellulose pulp liquor containing nitrogen compounds including oxygen linked to nitrogen in the molecule at a temperature within the range from about 40° to about 180° C. and at an acid pH within the range from about 0 to about 5 in the presence of nitrate ion $NO_3^-$ in a concentration calculated as nitrogen within the range from about 0.2 to about 5 gram moles per kilogram of water, and of lignin in a weight ratio lignin:water within the range from about 0.001:1 to about 1:1, and then continuing the autocatalytic reaction while maintaining a gas phase in contact with the liquid phase having a partial pressure of nitrogen oxide within the range from about 0.005 MPa to about 2 MPa, and withdrawing nitrogen oxide from the gas phase so as to maintain said partial pressure.

The process of the invention is applicable to any waste cellulose pulp liquor containing nitrogen compounds including oxygen linked to nitrogen in the molecule. Particularly suitable are waste liquors derived from chemical pulping processes, such as waste sulphate pulping liquor, waste polysulphide pulping liquor, waste soda pulping liquor, and waste sulphite pulping liquor, obtained from lignocellulosic material which has been pretreated with nitrogen oxide, or nitrogen oxide and nitric acid, before the pulping stage, or pulped with nitrogen oxide or nitrogen oxide and nitric acid, or nitric acid per se. The process is also applicable to waste liquors derived from cellulose pulp delignification processes including a bleaching or delignification stage in which the pulp has been treated before the delignification with nitrogen oxide, or with a mixture of nitrogen oxide and nitric acid, or with a mixture of nitrogen oxide, nitric acid and a nitrate salt, such as sodium nitrate. All such waste liquors contain nitrate ion, and in addition lignin compounds containing nitrogen oxide groups. Mixtures of these waste liquors can also be employed. Also useful are waste pulping liquors or bleaching/delignification liquors to which waste nitrogen oxide or nitrogen oxide-nitric acid or nitrogen oxide-nitric acid-nitrate salt liquors from cellulose pulp treatment have been added. Another such liquor can be spent nitric acid from any chemical treatment. All such liquors are referred to herein as "waste cellulose pulp liquor".

Particularly preferred waste cellulose pulp liquors are those which contain nitric acid, i.e., both hydrogen ion and nitrate ion. If however the liquor contains nitrate and/or lignin compounds containing nitrogen oxide groups, nitric acid can be added in the adjustment of pH of the liquor to within the desired range, for initiating the autocatalytic reaction.

Also preferred amoung such liquors are waste cellulose pulp liqours derived from the partial pre-digestion or pre-pulping of lignocellulosic material then pulped by any chemical pulping process, such as the sulphate, polysulphide, soda, and sulphite pulping processes, where the lignocellulosic material has been subjected to a pretreatment with nitrogen oxide and/or nitric acid, and therefore the liquors contain nitrate ion as well as lignin containing nitrogen oxide groups.

For example, in the delignification of chemical pulp, such as sulphate pulp, it has been found advantageous to pretreat the pulp with nitric oxide and/or nitrogen dioxide and oxygen gas prior to delignification. Waste liquor derived from such a pretreatment is particularly suitable in the process of this invention.

Following the pretreatment, the treated sulphate cellulose pulp is then subjected to delignification with alkali and optionally additional chemicals, such as oxygen and/or peroxide, for example. A particularly good delignification is obtained when oxygen gas is used in addition to alkali. Waste liquors derived from such alkaline delignification can also be used in the process of the invention. Mixtures of these waste liquors often are obtained in practice, and can also be used.

In such a pulp delignification process, the treating liquor containing nitrogen compounds is recovered from the pulp, normally in counter-current flow. The waste treating liquor can be separated from the pulp suspension at any of several locations in the process. Large quantities of nitrate ion and hydrogen ion (which together constitute nitric acid) are produced in the pretreatment, and are present in the waste liquor, while only a small amount of organic substance, mostly lignin, is dissolved in the liquor. When delignifying sulphate pulp, for example, the dissolution of lignin is often less than 1% by weight of the pulp. When a high production of nitrogen oxides is required in the process of the invention, it is important that as much as possible of waste liquor derived from such a pretreatment be employed.

Nitrate ion is also produced in small quantities in an alkaline delignification following such a pretreatment, because of reaction of the nitric acid present in the pulp or liquor with the alkali (such as sodium hydroxide) used in the alkaline delignification. In addition, when the liquor is recovered after the delignification, a certain carry-over of nitrate is also present, carried over from the pretreatment step. A part, for example, at least 30%, of the organic waste liquor from the alkaline stage can be recovered and mixed with waste liquor from the pretreatment, and used as starting material for the production of nitrogen oxides in the process of the invention. Incorporated in this waste liquor is lignin which contains nitrogen oxide groups. Other nitrogen compounds can be found in the waste liquor derived from the alkaline stage, and all of these are source material for the preparation of nitrogen oxides in the process of the invention.

For reasons of economy and also to prevent undesirable emissions from the pulp plant, it is advantageous when applying an alkaline delignification to sulphate pulp to integrate recovery of the waste pulping liquor with the recovery of waste liquors from the pretreatment stage and the alkaline delignification. The carry-over due to incomplete washing results in the transfer to the pretreatment of a certain amount of waste cooking liquor, and the lignin contained therein. This carry over has a positive effect on the production of nitrogen oxides in the process of the invention.

When waste liquor from the alkaline delignification is used at least in part to displace the major part of the waste cooking pulping liquor, waste liquor from the alkaline delignification will also be carried over to the pretreatment, and there assist in raising the lignin content of the waste liquor derived from the pretreatment.

When the solids content with respect to organic substances in the waste liquor is below 1%, the waste liquor is suitably concentrated before being used in the process of the present invention. This concentration can be effected under such conditions that the nitrogen present is not lost as nitrogen oxides during the concentration. The concentration should therefore be carried out at low temperature under reduced pressure, or the water can be separated by freezing out, or by the use of membranes.

In carrying out such a pretreatment, it is suitable to recycle waste liquor from the pretreatment back to the pretreatment. As a result of which recycling, the concentration of hydrogen ions and nitrate ions in the waste liquor increases, in comparison with a process in which there is no such recycling. This may make unnecessary concentration of the waste liquor selected for use in the process of the present invention.

Similarly, it is advantageous to recycle waste liquor from the alkaline delignification back to the alkaline delignification. This contributes to a desirable increase in the lignin content of the waste liquor from the alkaline delignification, and also towards more efficient use of the alkali, which results in an advantageous reduction in the sodium ion:lignin ratio in the waste liquor, and this renders that waste liquor more suitable in the process of the present invention.

As previously indicated, the desired autocatalytic reaction is initiated and carried out in the liquor phase, in the waste cellulose pulp liquor, under the conditions described. Throughout the reaction, the liquid phase is in contact with a separate gas phase normally above the liquid phase, and into which the nitrogen oxides product are formed. In this gas phase a partial pressure of nitrogen oxides is maintained within the stated range, by withdrawing therefrom nitrogen oxides product from time to time, or as formed. By "autocatalytic" is meant a process in which the reaction products formed in the course of the process accelerate the reaction. Thus, the reaction once initiated may be self-sustaining, and exothermic to the extent that cooling of the reaction mixture may be required to maintain the temperature within the stated range, and keep the reaction under control.

In general, it may be stated that nitrogen oxides are not produced at room temperature under normal atmospheric conditions. The reactions can however be initiated at a temperature above 40° C. A readily controlled process is obtained at from 40° to 50° C. provided the pH is below 2, preferably below 1, and the nitrate ion content is high. When the temperature is increased above 50° C., to from 55° to 65° C., the reactions forming nitrogen oxides are considerably faster, but still at these temperatures the pH should be below 2, and preferably below 1. A particularly favorable result is obtained when operating within the temperature range from about 75° to about 95° C.

If the content of nitrate ion is comparatively low, for example, from 0.2 to 0.4 gram mole per kilogram of water, the temperature should be increased above 95° C., whereupon a rapid reaction will be obtained.

At a preferred upper temperature limit of 160° C., heating can be effected indirectly, using steam heated to the required temperature; such steam is normally available in pulp mills.

The upper temperature limit is normally 180° C., but in fact the maximum temperature is determined by the coking limit in the apparatus in which the process is carried out.

The heating of the waste liquor can be carried out using conventional heating means, for example, by indirect heating and heat exchangers, or by direct injection of a gaseous heating medium, for example, steam, or by causing the waste liquor to pass through a preheated bed of packing material. By heating the liquor in an evaporator with indirect heating, one will at the same time reduce the water content and increase the solids content.

In order to obtain a pH on the acid side, and particularly below 2, it may be necessary to add a strong acid to the waste liquor. A preferred acid is nitric acid, but other mineral acids, for example, sulfuric acid, can also be used. It is not necessary that the acid be pure. Waste nitric acid can be used, for example, as derived from nitration processes, and waste sulfuric acid can also be used, as well as mixtures of nitric acid and sulfuric acid. The amount of acid is that required to adjust the pH to within the range from about 0 to about 5.

As indicated, the amount of nitrate ion is also brought to within the range from about 0.2 to about 5 gram mole per kilogram of water in the waste liquor. If the amount of nitrate ion is below this range, the liquor can be concentrated, or the nitrate can be added in the form of nitric acid, thus at the same time adjusting pH. A suitable nitrate ion concentration is within the range from about 0.4 to about 4 gram moles per kilogram of water, and preferably the concentration is within the range from about 0.5 to 3 gram moles per kilogram of water in the waste liquor.

The amount of lignin is within the range from about 0.001:1 to about 1:1 as the weight ratio of lignin:water. Many waste liquors contain an amount of lignin within this range, but if too low, lignin can be added, and if too high, the liquor can be diluted, for example, by the addition of mineral acid to adjust pH. Lignin can be added in the form of a solution, or a slurry, or in solid form. Sulphate lignin is suitably added in powder form, or in the form of evaporated black liquor solids, preferably admixed with acid to reduce the pH.

Frequently, it is also helpful to initiate the reaction by addition of nitrogen oxide, preferably nitrogen dioxide. Nitrogen oxide acts as a heel, since it is a reaction product which stimulates the autocatalytic reaction. The addition of nitrogen oxide simultaneously reduces the risk of unintended rises in pressure, with subsequent risk of explosion after initiation of the reaction.

It is important throughout the process to maintain the reaction conditions within the ranges stated, so as to maintain control of the reaction.

Thus, in order to initiate the reaction, a given amount of nitrogen oxide normally is introduced into the reactor. Nitrogen oxide is then produced. Once the reactions are underway, the removal of nitrogen oxide is then adjusted in relation to the amount of nitrogen oxides formed, so that the nitrogen oxides concentration in the gas phase in contact with the liquid phase is at a partial pressure within the range stated, from about 0.005 MPa to about 2 MPa.

It is often advantageous to add a small amount of oxygen into the gas and/or liquid phase, in order to obtain a high rate of proproduction of nitrogen oxides. However, the amount of oxygen supplied, for example, in the form of a stream of oxygen gas into the gas phase over the waste liquor present, should not be so high that the threshold value with respect to the partial pressure of nitrogen oxides in the gas phase in contact with the waste liquor is exceeded. In tests where other conditions remain constant, the formation of nitrogen oxides decreased by about at least 95% when a rapid stream of oxygen gas was passed through the reactor in an amount such that the threshold value of nitrogen oxides in the gas phase was exceeded.

The process of the invention makes it possible to produce nitrogen oxides in any of their various forms, including nitric oxide NO (nitrogen monoxide), nitrogen dioxide $NO_2$, and polymer forms and double molecules thereof, such as $N_2O_4$ and $N_2O_3$. One mole of $N_2O_4$ corresponds to 2 moles of $NO_2$, and one mole of $N_2O_3$ corresponds to one mole of NO plus one mole of $NO_2$. By "total partial pressure of nitrogen oxides in the gas phase in contact with the liquid phase" is meant the sum of the partial pressures of nitrogen oxides of these types. Nitrous oxide $N_2O$ is thought to be inert, and is not included.

It may further be noted that no optimum temperature, hydrogen ion concentration, or nitrate concentration exists, which will give an optimum result independently of the other parameters and of the amount of water and organic substance, i.e., lignin, present in the system. The parameters are each dependent upon each other and coact in the production of nitrogen oxides. It is therefore important that all of these parameters be maintained within the stated ranges throughout the process.

It is particularly suitable that the temperature increase automatically or autocatalytically in the course of the process. This means in most cases that exothermic reactions have begun. However, it may be necessary to reach the temperature at which the autocatalytic reactions become self-sustaining by supplying heat to the system.

A high hydrogen ion concentration in the waste liquor, corresponding, for example, to a pH below 0.5, is highly advantageous for the effective production of nitrogen oxides from a given volume of waste liquor. Moreover, a high hydrogen ion concentration makes it possible to use a relatively low reaction temperature. It has been found with many types of lignin that a high production of nitrogen oxide is obtained within the range from about 65° to about 100° C. when the pH of the waste liquor is below about 0.5. The concentration of free nitric acid should normally not be higher than one gram mole per kilogram of waste liquor.

A high nitrate ion content of the waste liquor also promotes the production of nitrogen oxides. The nitrogen content suitably is within the range from about 0.2 to about 5 gram moles per kilogram of water. A preferred range is from about 0.4 to about 4 gram moles per kilogram of water, and a particularly preferred range is from about 0.5 to about 3 gram moles per kilogram of water, in the waste liquor. In practice, the nitrate ion concentration is preferably higher than the hydrogen ion concentration in the waste liquor. If the amount of nitrate present in the waste liquor is too low, as previously stated, the nitrate concentration can be increased by addition of nitric acid.

It is important to select the conditions within the stated ranges that give a controllable reaction. If the lowest temperature is combined with the lowest pH and the lowest nitrate ion concentration, the rate of production of nitrogen oxides is negligible. On the other hand, if the highest temperature, the highest pH and the highest nitrate ion concentration are used, the nitrogen oxides may be formed so rapidly that the process is difficult to control, and may result in an explosion.

A preferred embodiment of the invention carries out the autocatalytic process in a continously operating reactor into which waste liquor is introduced continously or from time to time, i.e., intermittently, and from which treated waste liquor and the nitrogen oxides formed are removed, either continuously or from time to time. The rate of which the nitrogen oxides are withdrawn (usually effected by withdrawing part of the gas phase) is suitably so selected that the total partial pressure of the nitrogen oxides in the gas phase is within the stated range. It is preferred to supply several streams of waste liquor containing different quantities of hydrogen ions, nitrate ions, and lignin, and mix these streams together in the reactor. When proceeding in this manner, the autocatalytic process is accelerated and the recovery of nitrogen oxides increased, in comparison with a parallel control run in which the streams were mixed in a vessel upstream of the reactor, and then brought to the intended temperature.

At least one of the streams is either totally or substantially waste liquor derived from an alkaline delignification applied subsequent to subjecting cellulose pulp to a nitrogen oxide or nitrogen oxide/nitric acid pretreatment. One of the streams may advantageously comprise mineral acid, for example, nitric acid, or a waste liquor taken from the nitric oxide or nitric oxide/nitric acid pretreatment, in a manner such that the stream has a higher content of hydrogen ion and preferably also a higher content of nitrate ion than the other stream. As a result of this procedure, there is obtained in the waste liquor a local initiation of the autocatalytic process which then propagates and gives rise to an effective production of nitrogen oxides.

In order to produce nitrogen oxides in the process of the invention in an effective and at the same time controllable manner, the total partial pressure of the nitrogen oxides in the gas phase in contact with the liquid phase should be at least 0.005 MPa, preferably at least 0.05 MPa, and most preferably at least 0.08 MPa. This partial pressure may be permitted to increase above atmospheric pressure, in which case the reactor must of course be designed to operate at superatmospheric pressure. Partial pressures lower than 1, suitably lower than 0.6, and preferably below 0.3 MPa, are preferred with respect to cost, safety and the yield of nitrogen oxides. Partial pressures in excess of 2 MPa are not necessary, and add to material reduction in yield.

The nitrogen oxides in the gas phase should not be in contact with the liquid phase including the waste liquor for any longer than necessary, since this results in a reduction in the yield of nitrogen oxides. This probably due to reaction between the nitrogen oxide and the lignin. Accordingly, nitrogen oxide should be withdrawn, for example, by withdrawing part of the gas phase, as rapidly as possible, while maintaining the partial pressure of nitrogen oxides in the gas phase within the stated range. The time during which the nitrogen oxides may remain in contact with the liquid phase depends upon the other parameters of the treatment, but at high temperatures, in excess of 120° C., it is important to remove the nitrogen oxides as quickly as possible.

The distribution of nitric oxides among the various possible species, and especially the amount of nitrogen dioxide, in the nitrogen oxide-containing gaseous reaction mixture removed from the reactor depends upon whether or not oxygen is supplied to the reactor. While oxygen is supplied, the amount of oxygen supplied determines these proportions. When a low excess of oxygen gas is used, more than 90 mole percent calculated as nitrogen of the nitrogen oxides removed will be nitrogen dioxide. This is advantageous to the autocatalytic process, and probably also to certain reactions taking place in the course of the autocatalytic process, and when the recovered nitrogen dioxide is to be used, for example, to pretreat pulp prior to an alkaline delignification stage.

It is not necessary, however, to supply oxygen to the reactor in order for nitrogen oxides to be formed. This has been confirmed in tests in which the reactor was evacuated, filled with nitrogen gas, and then re-evacuated. The production of nitrogen oxide was initiated by a high increase in temperature of the waste liquor, to 90° C. and above. In such a process, the amount of nitric oxide formed outweighs the amount of nitrogen dioxide formed. The nitric oxide is converted to nitrogen dioxide in known manner, for example, by oxidation with oxygen gas.

The autocatalytic process results in the initiation of exothermic reactions resulting in a rise in temperature when the process is allowed to take place in an adiabatic reactor. In most cases where the liquor is heated to initiate the reactions, the liquor should be heated to a temperature which is several degrees, for example, at least 5° C., lower than the highest temperature resulting from the exothermic reactions. This is to enable control of the reaction temperature. The temperature rise in the preferred embodiment of the invention is particularly high when oxygen is present. In this regard, it is suitable to conduct the treatment of the invention in a manner such as to obtain a given wet combustion of the organic material, such as lignin. These reactions leading to a rise in temperature can initiate or contribute to an initiation of the production of nitrogen oxides from the waste liquor introduced into the reactor. Both the rise in temperature caused by heat generation and contact with the gas phase containing nitrogen oxides contributes in this case to the effect of the treatment. The optimum conditions for the production of nitrogen oxides however are primarily determined by the composition of the waste liquor, which in turn is determined by the method by which the liquor was recovered.

The exothermic nature of the reactions that take place means that heat can be recovered from the system. The reaction chamber or zone and/or the waste liquor are therefore cooled as required to enable effective control of the process within the stated ranges. A cooling can also eliminate the risk of explosion.

As indicated previously, the amount of lignin present in the waste liquor is important to the results, and the weight ratio of the lignin:water in the waste liquor should be within the range from 0.001:1 to 0.1:1, suitably within the range from 0.005:1 to 0.8:1, and preferably within the range from 0.02:1 to 0.4:1. If the amount of lignin present in the waste liquor is outside these ranges, the lignin content should therefore be adjusted either by addition of lignin or by dilution of the waste liquor. The nature of the lignin and the type of wood from which it originates as well as the digestion method employed in the preparation of the pulp from which the waste liquor is obtained are also significant, as well as reaction temperature, nitrate ion and hydrogen ion concentration, and the other process parameters, but good results are generally obtained when the amount of lignin is within the stated ranges.

The nitrogen oxides produced by the process of the invention are withdrawn from the system and recovered for reuse. The waste liquor after separation from the system can be returned to the pretreatment step from which it was originally obtained. It can also be blended with fresh waste liquor in the process. It can also be mixed with washing liquor in the washing operations undertaken in connection with the pretreatment of the pulp, for example, with nitrogen oxide and oxygen. If the waste liquor is recycled to the process of the invention, it is preferably replenished with newly supplied waste liquor and with nitric acid, but a part of the waste liquor can also be recycled without any replenishment, if it is combined with fresh waste liquor.

It is also possible to recover the chemicals present in the waste liquor by subjecting it to combustion, as in the recovery of pulping liquor.

The nitrogen oxides produced by the process of the invention can be manufactured inexpensively, and can be used for any purpose for which nitrogen oxides are required.

For example, a particularly good and economical use is to employ the nitrogen oxides for the pretreatment of pulp with, for example, nitrogen dioxide and oxygen, the pretreatment being followed by an alkaline delignification of the pulp. The improvement in economy derives from the fact that the greater part of the most expensive chemical used in this pretreatment, the nitrogen dioxide, is obtained by the recovery process of the invention. When the price of nitric acid calculated per mole of nitrogen is substantially lower than that of dinitrogen tetroxide, which is normally supplied to the pulp in this pretreatment instead of nitrogen dioxide which has been purchased or manufactured on site from ammonia, it is possible to produce to advantage all of the nitrogen dioxide required by the process according to the invention. This is particularly attractive in locations where waste nitric acid is also available.

The pretreatment of pulp with nitrogen dioxides and oxygen, adding nitric acid in order to reduce the amount of nitrogen oxygen added, has the disadvantage that an extensive acid hydrolysis of the carbohydrates in the pulp is obtained. When nitrogen oxides produced in accordance with the invention are employed, the cost is so low that the concentration of nitric acid during the pretreatment can be held at such a low level that depolymerization of the carbohydrates in the pulp during the pretreatment is drastically reduced, while maintaining the overall economy of the process, and indeed in many cases a reduced cost. This results also in a noticeable improvement in the quality of the cellulose pulp produced in this pretreatment.

When the nitrogen oxides are produced within the pulp plant by burning ammonia, nitric acid is formed as a by product. This acid can advantageously be used to acidify the waste liquor according the invention, and serves also as a source for the production of nitrogen oxides.

When the need to supply external nitrogen oxides is satisfied by purchasing nitrogen oxides from external sources, the quantities of nitrogen oxides which need to be transported are reduced when the process of the present invention is employed. In any case, the process of the invention makes it possible to keep the emission of nitrogen oxides quite low, when handling different types of waste liquors.

The following Examples in the opinion of the inventors represent preferred embodiments of the invention.

EXAMPLES 1 to 5

In these Examples the waste liquor was a waste liquor derived from the pretreatment of sulphate pulp with nitrogen dioxide, oxygen gas, nitric acid, and sodium nitrate. The concentration of free nitric acid in the liquor, determined by titration with with sodium hydroxide at pH 3.5, was 0.7 gram mole per kilogram of waste liquor. The total nitrate ion concentration was 1.6 gram mole per kilogram of waste liquor.

The lignin present was obtained from a mixture of black liquor, i.e., liquor from the sulphate digestion of wood, and waste liquor derived from a pulp which has been oxygen gas bleached in the presence of alkali subsequent to having been pretreated with nitrogen dioxide and oxygen gas. The lignin was precipitated from the waste liquor mixture by acidification. Because the lignin was free from alkali, it was possible to study the effect of various quantities of lignin without changing the ratio between total nitrate and free nitric acid. The precipitated lignin had a solids content of 94%.

The process was carried out using various proportions of lignin, nitric acid and sodium nitrate in the waste liquor.

Into a 300 ml glass reactor vessel containing 50 ml of glass balls having a diameter of 3 mm, 15 grams of waste liquor was charged, while the amount of lignin was varied in accordance with the Examples shown in Table 1. After introducing the waste liquor and lignin, the reaction vessel was evacuated and then caused to rotate in a water bath heated to a temperature slightly higher than the desired reaction temperature. When the desired temperature has been reached in the reactor vessel, 50 ml of oxygen gas was introduced at room temperature. The reaction time was calculated from this point in time.

Small gas samples were taken after 5, 15 and 30 minutes of reaction to determine the nitrogen dioxide content. The results are shown in Table I.

The comparisons were carried out together with a control in which no lignin was present, but containing the same quantities of nitric acid and sodium nitrate as in the other Examples.

TABLE I

| Example No. | Reaction Temperature | Amount of lignin g | $NO_2$ in the gas phase, percent by volume | | |
|---|---|---|---|---|---|
| | | | 5 minutes | 15 minutes | 30 minutes |
| Control | 66 | 0 | <0.1 | <0.1 | <0.1 |
| 1 | 66 | 1 | 3 | 9 | 7 |
| 2 | 66 | 2.5 | 12 | 50 | 35 |
| 3 | 66 | 5 | 12 | 80 | 50 |
| 4 | 66 | 10 | 10 | 45 | 25 |
| 5 | 39 | 10 | <0.1 | 1 | 1 |

The results for the Control show that when no lignin is present, no nitrogen oxide is produced. Thus, lignin is essential for the autocatalytic reaction.

In the Examples in accordance with the invention, significant quantities of nitrogen dioxide were produced except in Example 5, where the temperature 39° C. was obviously too low. Optimum nitrogen dioxide production was obtained with a mixture of 15 grams of waste liquor and 5 grams of lignin, Example 3.

The results show that a reaction time of 15 minutes gives the highest production of nitrogen dioxide. The amount of nitric oxide in Examples 1, 2, 3 and 4 reached 9 to 80% by volume. In the Control and Example 5, the amount of nitric oxide was 1% by volume or less. The amount of nitrogen dioxide recovered in the gas phase after 15 minutes in Example 3 was about 70 mole percent, calculated on the amount of nitric acid charged. A slightly lower value was obtained after 12 minutes, while increasing the time to 30 minutes greatly reduced the yield.

When the reactions were carried at a temperature of 90° C. with lignin charges of 0.5, 1, 4, and 8 grams, respectively, the gas phase became a deep red color (showing a high concentration of nitrogen oxide polymers) after several minutes of reaction. After a reaction time of less than 5 minutes, the pressure of nitrogen oxides in the vessel was so high that leakage resulted. No tests were carried out at higher temperatures, for safety reasons. The results show that an increase in temperature results in a marked increase in the rate of formation of nitrogen oxides. However, the results also show that the reaction time should be comparatively short, i.e., that the nitrogen oxides should not be allowed to remain in contact with the liquid phase any longer than necessary, and that a low lignin content is sufficient, at comparatively high reaction temperatures.

EXAMPLES 6 to 8

Example 3 was repeated using the same waste liquor, 15 grams, together with 5 grams of lignin. The temperature was increased to 66° C. and oxygen gas then introduced into the reactor. Samples of the gas phase were taken after 15 minutes of reaction time, and the amount of nitrogen dioxide determined in the samples. The results obtained are shown in Table II.

TABLE II

| Example No. | Amount HNO$_3$ g mole/kg, waste liquor | Amount total nitrate g mole/kg waste liquor | NO$_2$ in the gas phase percent by volume |
|---|---|---|---|
| 3 | 0.7 | 1.6 | 80 |
| 6 | 0.7 | 1.1 | 15 |
| 7 | 0.7 | 0.75 | 3 |
| 8 | 0.35 | 1.25 | 5 |

Example 3 is included in Table II for comparison.

It is apparent from the results that increasing the amount of total nitrate above a constant amount of nitric acid greatly increases the production of nitrogen oxides. Thus, the total nitrate concentration in the waste liquor should be higher than the concentration of free nitric acid.

A reduction in both concentration of nitric acid and total nitrate also results in an extremely low production of nitrogen oxides. However, even under such conditions, it is possible to obtain a high nitrogen oxide content in the gas phase. When increasing the reaction temperature to 90° C. using Example 8, a powerful generation of nitrogen oxides took place, resulting in a reddening of the gas phase, superatmospheric pressure in the reactor, and subsequent leaking.

EXAMPLE 9

This Example illustrates the process of the invention, in increasing the reaction temperature as the process continues. The temperature was increased stepwise, and the nitrogen dioxides formed were removed by a stream of oxygen gas passed through the reactor. In practice, evacuation or reduction in the system pressure can also be used to reduce or optionally eliminate the consumption of oxygen gas.

The same waste liquor was used as in Example 3, as also were the amounts of lignin, free nitric acid, and nitrate in the waste liquor. The initial reaction temperature was 55° C. When the reaction temperature reached 55° C., 0.5 gram nitrogen dioxide was added for each 100 grams of lignin present in the waste liquor. Oxygen gas was supplied immediately thereafter to raise the pressure to atmospheric. After ten minutes of reaction, a stream of oxygen gas preheated to 55° C. was swept through the reactor vessel for five minutes at a rate of flow of 100 ml per minute measured at room temperature. The temperature was then increased over two minutes to 66° C. and the reactor maintained at this temperature for five minutes, after which oxygen gas at 66° C. was passed through the reactor vessel for five minutes at the same velocity. This temperature was then increased over three minutes to 85° C., and maintained at this level for ten minutes. The nitrogen oxides formed were removed from the reactor over the entire reaction period at 85° C. with a weak flow of oxygen gas at a rate of 30 ml per minute. The reactor vessel was then cooled, and a stream of oxygen gas at a rate of 100 ml per minute was blown through the reactor vessel for five minutes in order to displace residual nitrogen oxides.

The oxygen gas used to displace the nitrogen oxides was caused to pass through washing bottles containing sodium hydroxide and hydrogen peroxide. The nitrogen oxides formed were thus converted to nitric acid. This was determined by titration with hydrochloric acid, whereupon carbon dioxide formed in large quantities, and was expelled by boiling. A pH of 5 was used as a point of equivalence.

The results showed that in this case the recovery of nitric oxide and nitrogen dioxide was 92% calculated as moles in percent of the number of moles of free nitric acid charged together with nitrogen dioxide. The results show that an increase in temperature during the treatment period can result in a high yield of nitrogen oxides. The nitrogen oxides formed are suitably removed from the reactor vessel from time to time. This is of particular importance when carrying out the preferred embodiment of the invention, in which oxygen gas is introduced into the reactor vessel.

Similar runs were carried out in which the temperature was reduced at the various levels by 10° C. In this case, the yield decreased to 75%, and did not improve when the reaction time was extended. One reason for this would seem to be that the formation of other nitrogen compounds, such as lignin containing nitro groups, was favored.

Runs were made in pressure vessels made of acid-proof steel, confirming that a temperature increase, for example to 120° C., not only enables the reaction time to be shortened, but also results in an improved yield of nitrogen oxides. It is particularly important at high reaction temperatures to remove the nitrogen oxides quickly, as they are formed. At high temperatures, the partial pressure of the nitrogen oxides in the gas phase can be at a lower level than at low reaction temperatures.

Having regard to the foregoing disclosure, the following is claimed as the inventive and patentable embodiments thereof:

1. A process for producing nitrogen oxides from aqueous waste cellulose pulp liquor containing nitrogen compounds including oxygen linked to nitrogen in the molecule, which comprises separating aqueous waste cellulose pulp liquor containing nitrogen compounds including nitrogen linked to oxygen from pulped lignocellulosic material; initiating an autocatalytic reaction generating nitrogen oxide in a liquid phase of said separated liquor with the nitrogen compounds including oxygen linked to nitrogen in the molecule at a temperature within the range from about 40° to about 180° C. and at an acid pH within the range from above 0 to about 5 in the presence of nitrate ion NO$_3^-$ in a concentration calculated as nitrogen within the range from about 0.2 to about 5 gram moles per kilogram of water, and of lignin in a weight ratio lignin:water within the range from about 0.001:1 to about 1:1; and then continuing the autocatalytic reaction while maintaining in contact with the liquid phase a gas phase having a partial pressure of nitrogen oxide within the range from about 0.005 MPa to about 2 MPa; and withdrawing nitrogen oxide from the gas phase so as to maintain said partial pressure.

2. A process according to claim 1 carried out as a continuous operation in a reaction zone, continuously adding pulp liquor together with nitrate ion, hydrogen ion, lignin, and waste liquor as required to sustain the autocatalytic reaction, and continuously withdrawing nitrogen oxides from the gas phase and waste liquor from the liquid phase from the reaction zone.

3. A process according to claim 1 in which oxygen is added to assist in initiating the reaction.

4. A process according to claim 1 in which nitrogen oxide is added to aid in initiating the reaction.

5. A process according to claim 1 which includes withdrawing waste cellulose pulp liquor, and recycling to the initiating stage.

6. A process according to claim 1 which comprises adding nitric acid to increase nitrate ion concentration and reduce pH.

7. A process according to claim 1 which comprises sustaining the autocatalytic reaction by carrying out the process under conditions selected from within the stated ranges that result in an exothermic autocatalytic reaction, while cooling to maintain the temperature within the range from about 40° to about 180° C.

8. A process according to claim 1 in which the nitrogen content of the waste liquor is within the range from about 0.4 to about 4 gram moles per kilogram of water.

9. A process according to claim 1 in which the nitrogen content of the waste liquor is within the range from about 0.5 to about 3 gram moles per kilogram of water.

10. A process according to claim 1 in which the pH is below 0.5 and the temperature is within the range from about 65° to about 100° C.

11. A process according to claim 1 in which the partial pressure of nitrogen oxides is within the range from about 0.005 MPa to about 0.5 MPa.

12. A process according to claim 1 in which the partial pressure of nitrogen oxides is within the range from about 0.08 MPa to about 0.3 MPa.

13. A process according to claim 1 in which the cellulose pulp liquor has at least a 1% content of lignin.

* * * * *